United States Patent
Kominis et al.

(10) Patent No.: US 11,275,937 B2
(45) Date of Patent: Mar. 15, 2022

(54) QUANTUM BIOMETRIC IDENTIFICATION OF ULTRAHIGH SECURITY BASED ON THE QUANTUM STATISTICS OF PHOTODETECTION BY THE HUMAN RETINA

(71) Applicant: QUANTUM BIOMETRONICS PRIVATE COMPANY, Heraklion Crete (GR)

(72) Inventors: Iannis Kominis, Heraklion Crete (GR); Michail Loulakis, Heraklion Crete (GR)

( * ) Notice: Subject to any disclaimer, the term of this patent is extended or adjusted under 35 U.S.C. 154(b) by 135 days.

(21) Appl. No.: 16/500,101

(22) PCT Filed: Apr. 2, 2018

(86) PCT No.: PCT/GR2018/000019
§ 371 (c)(1),
(2) Date: Oct. 2, 2019

(87) PCT Pub. No.: WO2018/185506
PCT Pub. Date: Oct. 11, 2018

(65) Prior Publication Data
US 2021/0103724 A1    Apr. 8, 2021

(30) Foreign Application Priority Data
Apr. 7, 2017   (GR) .............................. 20170100162

(51) Int. Cl.
*G06K 9/00* (2006.01)

(52) U.S. Cl.
CPC ..... *G06K 9/00597* (2013.01); *G06K 9/00899* (2013.01)

(58) Field of Classification Search
CPC ... G06K 9/00597; G06K 9/00899; G06K 9/00
See application file for complete search history.

(56) References Cited

U.S. PATENT DOCUMENTS

| 2010/0149073 A1* | 6/2010 | Chaum | G02B 27/0172 345/8 |
| 2012/0185698 A1* | 7/2012 | Fiske | G06Q 20/40145 713/186 |

(Continued)

FOREIGN PATENT DOCUMENTS

JP    2001 273498 A    10/2001

OTHER PUBLICATIONS

ISR; European Patent Office; NL; Dec. 20, 2018.
(Continued)

*Primary Examiner* — Ming Y Hon
(74) *Attorney, Agent, or Firm* — Patshegen IP LLC; Moshe Pinchas (57) ABSTRACT

The invention is about a human identification method based on the perception of low-intensity light. In its path towards the retina, light suffers optical losses. For any illuminated ganglion receptive field, the number of detected photons divided by the number of photons incident on the eye is called a, and is different from field to field for the same subject, and for geometrically similar fields in different subjects. The identification is based on a a-map. The user is asked to respond positively/negatively on the perception of light pulses illuminating various receptive fields chosen to have either high-α or low-α. The choice is random, hence an impostor is forced to respond randomly to the device's interrogations. The illumination of receptive fields can be done serially or in parallel, leading quickly to false positive and false negative identification probabilities at the level of $10^{-10}$ and $10^{-4}$, respectively.

5 Claims, 4 Drawing Sheets

(56) References Cited

U.S. PATENT DOCUMENTS

| | | | |
|---|---|---|---|
| 2013/0114041 A1 | 5/2013 | Iftekharuddin et al. | |
| 2015/0179028 A1* | 6/2015 | Bairaktaris | G08B 5/36 |
| | | | 340/815.4 |
| 2017/0323167 A1* | 11/2017 | Mapen | G06K 9/00604 |
| 2019/0028468 A1* | 1/2019 | Garcia | G06K 9/00892 |

OTHER PUBLICATIONS

Unar J A et al: "A Review of Biometric Technology Along With Trends and Prospects," Pattern Recognition, vol. 47, No. 8; Aug. 4, 2014.

* cited by examiner

QUANTUM BIOMETRIC IDENTIFICATION OF ULTRAHIGH SECURITY BASED ON THE QUANTUM STATISTICS OF PHOTODETECTION BY THE HUMAN RETINA

This invention is about a new biometric identification method, which is based on the detection by the retina, and the subsequent perception of weak-intensity light. In contrast to all existing methods, the security of this method against malicious impostors is based on the laws of quantum physics.

Biometric identification, that is, identifying people through some unique characteristics, is since a long time tied to security and law enforcement at the national and international level. Especially nowadays, in a globalized society of 7 billion people suffering from international terrorism and ever more sophisticated ways of breaking the law, issues of security and identification have become prominent. A traditional method for biometric identification has been fingerprinting, with the fingerprints having a unique formation for each human subject. Other methods include face and voice recognition and graphology. But with these methods, nothing prevents an impostor E whishing to maliciously impersonate person A to mimic these biometric characteristics. Thus it is desired to develop methods that are difficult to foil.

A more recent method is based on the image of the retina and/or the iris. For example, the geometric formation of blood vessels on the retina is unique for each person. Similarly, the particular patterns of the tissue on the iris have the property of uniqueness. Imaging the retina and the iris are currently the state-of-the-art in biometrics. The common disadvantage of both, and for that matter all other, biometric modalities is that there is no physical law preventing their foil, which might today be technologically demanding, but certainly not impossible.

The current invention overthrows this common limitation of all existing biometric methods, namely that a technologically sophisticated impostor can in principle intercept and foil them. The new identification method is based on quantum physics and the probabilistic nature of photodetection by the photosensitive cells of the human retina. Stated simply, it is a complex "fingerprint" including the eye, the retina and the optical lobe of the brain. The ultra-high security of the method is based on the laws of quantum measurements, like other recent quantum technologies such as quantum cryptography. Moreover, in contrast to all existing biometric methods, the security of the current method can be fully quantified, whereas for all the others it can just be stated that "it is difficult" to foil them, without anyone being able to quantify this difficulty.

In more detail, this biometric method is based on the measurement of the optical losses suffered by light in its path from the eyeball's surface towards the retina. These losses, described by the parameter a, include the probability of no detection of the photons by the retina's photosensitive cells, the rods, which are in the retinal surface being illuminated. The value of the parameter can be measured if the photon number incident on the user's eye is known, and given the user's response on whether he/she perceives a flash of light containing this known photon number.

In more detail, focusing on a single ganglion receptive field, which is the smallest area of the retina that should be illuminated so that a human perceives light in scotopic conditions, and which in a given subject is characterized by a specific value of the parameter a, the measurement of $\alpha$ is performed as follows. We illuminate this field with a laser pulse of wavelength 532 nm, duration about 0.1 s, and known mean photon number. This number can be measured with a single-photon detector. Every time we illuminate we ask the user whether he/she perceived the flash of light. If after N interrogations we get v positive answers, we can calculate a for the specific ganglion receptive field of the specific user, as will be explained in detail in the following. We repeat this procedure for many different receptive fields across the retina, which are described by a different a, and thus we construct the $\alpha$-map, which is unique for this user.

The fact that this $\alpha$-map can be used as a biometric identifier is based on two known facts. (A) The parameter $\alpha$ has a strong dependence (on the order of 40 dB) on the particular point across the retina being illuminated, and (B) the parameter $\alpha$ changes significantly (3 dB) from subject to subject for a geometrically similar point on the retina.

Even though it has been known for several decades that light suffers optical losses along its path towards the retina, the current biometric method is the first to propose the use of these optical losses, that is the $\alpha$-map, as a biometric identifier. This is the first central idea of the method.

With the aforementioned measurement procedure the device stores the $\alpha$-map of user A. When the user wishes to be identified (for example in order to be allowed to enter a high-security building), the device must perform some measurements, and given the user's stored $\alpha$-map, decide if it is indeed the user A or some impostor E pretending to be the user A. How this is achieved in the minimum amount of time is the second central idea of the method to be explained in the following.

In summary, the security of the method is based on two facts. First, by illuminating the retina of the user with weak light and asking him/her to respond on the perception of light, the biometric data are captured through the user's conciousness during the measurement, and hence are impossible to «intercept», like the ordinary fingerprints. Another layer of security follows from the specific identification methodology to be presented in the following. An impostor E maliciously claiming to be the user A is forced by the physics and methodology of the measurement to reply randomly to the device's interrogations on perceiving or not the light pulses. Using the whole $\alpha$-map, these random responses lead to a very small probability for the impostor to pass the test.

Definitions

Photon The quantum of electromagnetic radiation. Any radiation source of a given wavelength and given power emits a given integer number of photons per unit time.

Light pulse (or flash) Electromagnetic radiation, the electromagnetic field of which is nonzero for a finite duration of time.

Light flash duration (T) is the time during which the electromagnetic field is nonzero.

Light flash intensity (I) is the number of photons of the flash divided by the pulse duration.

Mean photon number per flash ($\tilde{I}$), is the intensity of the flash times the flash duration ($\tilde{I}=IT$).

Coherent radiation is the radiation produced by a laser.

Photon statistics of coherent radiation are the photon number fluctuations of a pulse of light of given mean photon number per pulse. These fluctuations follow the Poisson distribution.

Retina is the tissue in the back of the eye containing the photosensitive cells, the rods used for low-intensity black and white vision, and the cones, used for high intensity color vision.

Ganglion receptive field is the retina's surface which when illuminated elicits a response by a ganglion cell, which communicates the perception of light to the brain. This surface is about 0.2 by 0.2 mm and contains 100-500 rods.

Detection threshold (K) is the number of photons that must be detected by a ganglion receptive field for the perception of vision to be triggered. From a large number of experiments it is known that K=6. The reason that visual processing has led to this threshold is the suppression of dark noise, which is the thermal isomerism of rhodopsin and hence the false perception of light. With this threshold the brain avoids this false perception.

Optical loss parameter ($\alpha$) is the parameter characteristic of a given optical path from the eye's surface until the illuminated ganglion receptive field, and includes the optical losses along this path, that is the number of photons lost due to scattering and absorption, as well as the probability of no photodetection by the retina. Typical values of this parameter are between 0 and 0.2.

False positive probability ($p_{fp}$) is the probability that an impostor, maliciously claiming to be one of the users supposed to be positively identified by the biometric device, will pass the biometric test.

False negative probability ($p_{fn}$) is the probability that one of the users supposed to be positively identified by the biometric device fails the test. The desired values for these two probabilities determine the test's duration.

A pulse of light of coherent laser radiation having mean photon number per pulse $\tilde{I}$ contains n photons with probability (Poisson distribution with parameter $\tilde{I}$) $p(n, \tilde{I})=e^{-\tilde{I}}\tilde{I}^n/n!$. Given that the mean photon number per pulse is $\tilde{I}$ at the eye's surface, and from them $\alpha\tilde{I}$ photons on average are detected by the illuminated rod cells, the probability that exactly n photons are detected is $p(n, \alpha\tilde{I})$. For this light pulse to be perceived, the detected number of photons must exceed the detection threshold, $n \geq K$. The probability for this to happen is $$P_{see}(\tilde{I}) = \sum_{n=K}^{\infty} p(n, \alpha\tilde{I}).$$

Figure 1:
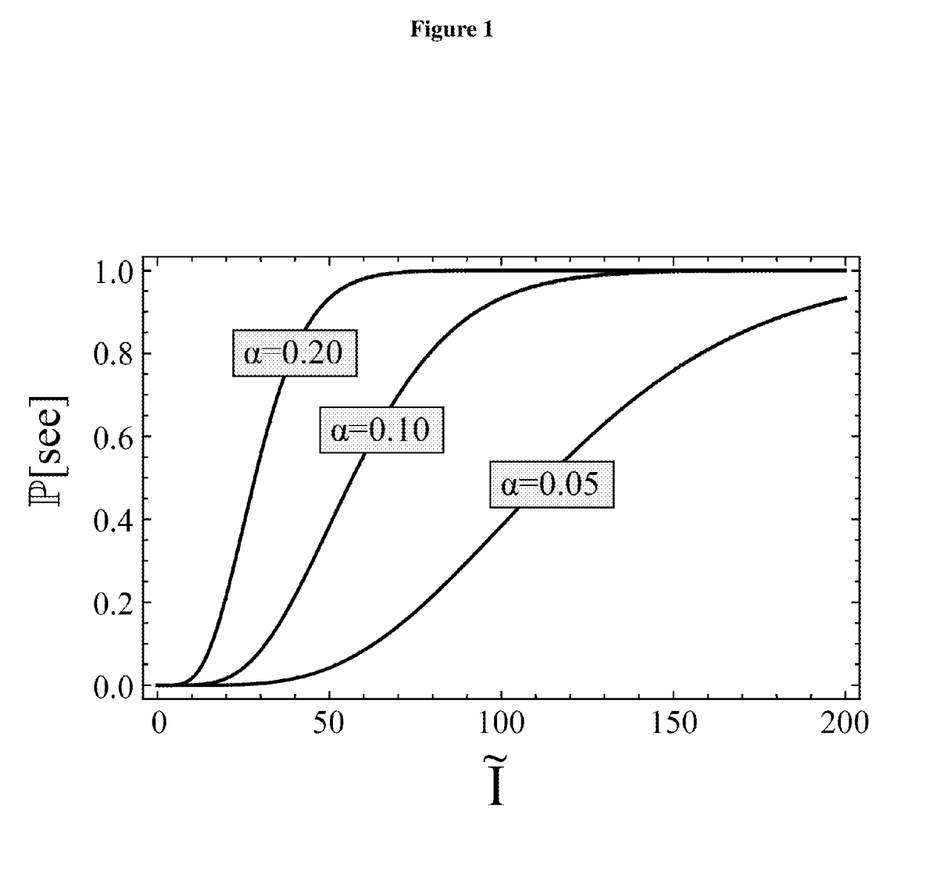
FIG. 1 depicts the probability $P_{see}$ to see a light flash containing $\tilde{I}$ photons per pulse on average as a function of $\tilde{I}$, for various values of the parameter $\alpha$, which describes the fraction of the photons lost along the laser beam's path from the surface of the eye towards the retina, including the probability of no photodetection by the illuminated rod cells. The smaller the value o $\alpha$, the slower is the increase of $P_{see}$ with $\tilde{I}$, because the more photons are required to exceed the detection threshold of the visual system (K=6).

The dependence of this probability on the mean photon number per pulse $\tilde{I}$ is shown for various values of the parameter $\alpha$ in FIG. 1.

Figure 2:
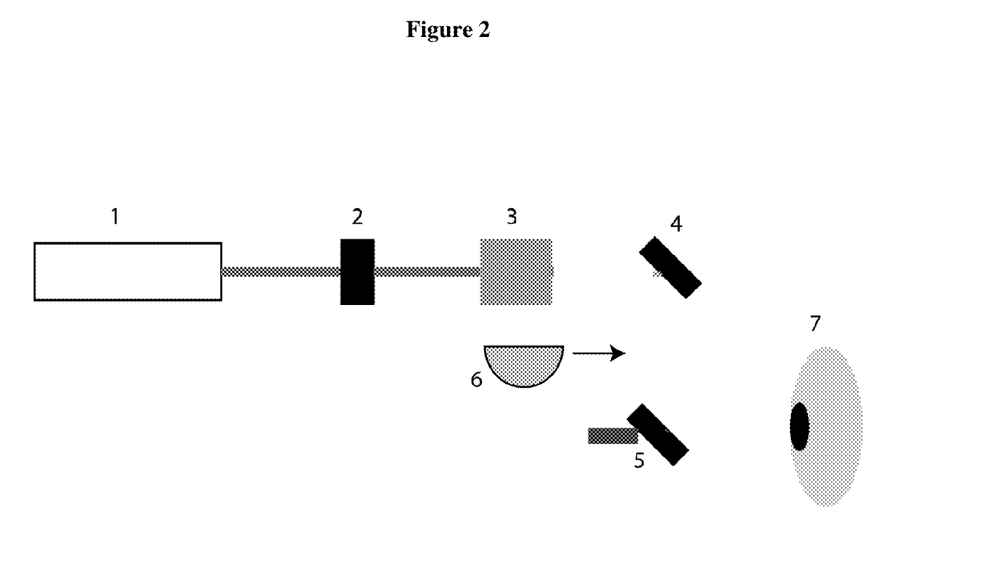
FIG. 2 schematically depicts a diagram realizing the biometric identification method, which includes (1) a coherent laser source at 532 nm, (2) an electronically controlled mechanical iris, (3) optical filters, (4) mirror, (5) electronically controlled mirror, (6) single-photon counter for measuring the mean photon number per pulse, and (7) eye of the examined subject.

Based on the definition of the function $P_{see}(\tilde{I})$ and its dependence on the parameter $\alpha$ as depicted in FIG. 1, the measurement procedure for the initial storage of the $\alpha$-map of user A as described above can be better analyzed as follows. Every ganglion field to be included in the $\alpha$-map is illuminated by a laser pulse with mean photon number per pulse $\tilde{I}$. The values of $\tilde{I}$ are chosen between 20 and 200 photons. The laser of wavelength 532 nm is followed by a mechanical iris, which is electronically controlled to stay open for the desired time of about 0.1 s in order to create the laser pulse. The iris is followed by optical filters which decrease the laser intensity to levels such that the number of photons per pulse is in the desired range between 20 and 200 photons. For example, if the laser power is 1 mW, the necessary filters must have a total power transmission of $10^{-12}$ to reach the level of 200 photons per pulse. Before the laser pulse is lead to the eye there is an optical setup (electronically controlled mirror) that can determine which spot on the retina will be illuminated. The schematic of this procedure is shown in FIG. 2.

If after N interrogations the user reports that he/she perceived v pulses, then the ratio v/N is an estimator of $P_{see}(\tilde{I})$, and the parameter $\alpha$ of the investigated ganglion field can be determined as $$\alpha = \frac{1}{\tilde{I}} P_{see}^{-1}(v/N),$$

where $P_{see}^{-1}(x)$ is the inverse function of $P_{see}(x)$. The number N of interrogations is determined by the desired accuracy of estimating $\alpha$. Repeating the same procedure for various receptive fields the $\alpha$-map of user A is measured and stored in the biometric device. This procedure is time-consuming, but as it will be demonstrated in the following, it is required only once for the initial measurement and storage of the user's $\alpha$-map.

When user A presents himself as A and asks to be identified, the biometric device must perform an identification procedure. The simplest idea is to repeat the previous measurement procedure, that is re-measure the user's $\alpha$-map and compare it with the one initially stored. However, this procedure is time-consuming and would make this biometric identification method impractical, because every time user A wishes to be identified, she must undergo a time-consuming interrogation.

This problem is solved with the second central idea of the current invention. The biometric device is aware of the user's $\alpha$-map, hence it knows which fields on the retina are described by a low $\alpha$ and which are described by a high $\alpha$. If the former are illuminated, the probability that the user perceives the light pulses is low, while if the latter are illuminated, the probability is high.

The central idea of the identification methodology is that the biometric device will randomly choose whether to illuminate a low-$\alpha$ or a high-$\alpha$ spot on the retina, but it will do so using pulses with the same average photon number for both cases. This methodology has an important consequence for the security of the method. An impostor pretending to be user A, even if he is aware of the identification procedure, he does not know whether the device has chosen to illuminate a low-$\alpha$ or a high-$\alpha$ in any given interrogation. Hence the only strategy left to the impostor is to respond randomly to the question on whether he perceived the light pulse. Even if the impostor is equipped with an ideal photodetector, he is again forced to respond randomly, because precisely knowing the mean photon number per pulse does not offer the impostor any information. In contrast, the real user will most likely respond correctly, and the device will be able to quickly identify him.

The realization of this identification strategy can be done in two ways that will be described next. The first is serial and the other parallel, minimizing the test time. These two methodologies are the third and fourth central idea of the current invention.

The serial method is based on a real-time update of the probability that the interrogated subject is the user who claims he is, based on the running record of the subject's responses and the Bayesian statistical analysis. While mathematical methods and proofs are not patentable, the idea of this serial identification method that is part of this request for intellectual protection is not about the actual mathematical proofs leading to the calculation of the false positive and negative probabilities and number of interrogations, but the concrete idea of analysing the responses of the examined subject in real time, and of calculating the conditional probability (not the calculation itself) that the examined subject is the one he is claiming to be, given his running record of responses.

In more detail, in the serial method the subject's eye is illuminated with a series of N pulses, each one of which illuminates, with random order, a field with low $\alpha$ ($\alpha_{min}=0.02<=\alpha<=0.05=\alpha_L$) or a field with high $\alpha$ ($\alpha_H=0.15<=\alpha<=0.20=\alpha_{max}$). If the tested subject claims that she is user A, then the biometric device calculates after every response to the interrogating laser pulse the conditional probability that the examined subject is indeed A, given the running record of the subject's responses. The following mathematical calculation is here included for the sake of completeness, that is, it is not part of the requested intellectual protection.

Figure 3A:
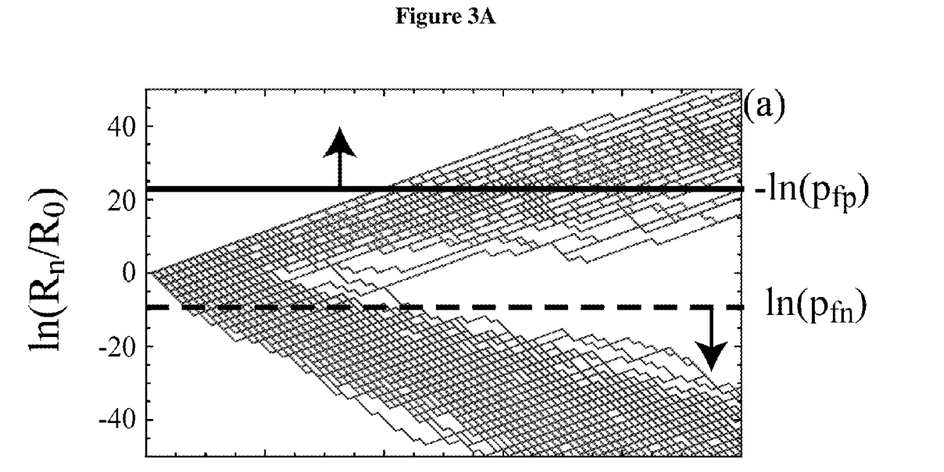
FIG. 3a depicts a Monte Carlo simulation of the serial identification method, in particular the random walks of the quantity $\ln(R_n/R_0)$ for user A (blue upwards lines) and impostor E (red downwards lines). When the random walk exceeds the upper threshold ($-\ln(p_{fp})$, horizontal solid line) user A is identified, while when the random walk crosses the lower threshold ($\ln(p_{fn})$, dashed horizontal line) the impostor is identified.
Figure 3B:
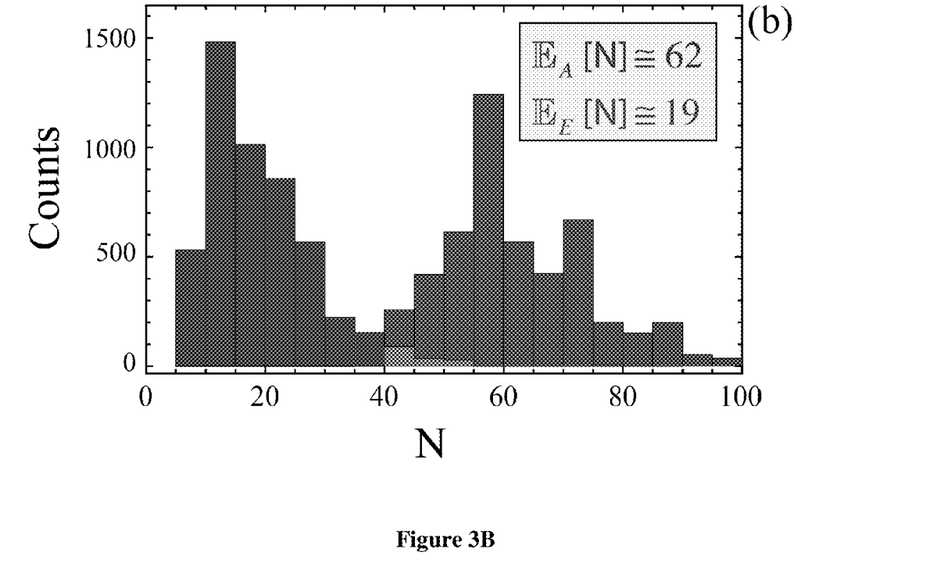
FIG. 3b depicts the distribution of the test termination times and their mean values.

We define the ratio $R_i = P[A|F_i]/(1-P[A|F_i])$, where $P[A|F_i]$ is the conditional probability that the examined subject is indeed user A, given the previous responses from the first until the i-th interrogation. It can be proven that the ratio $Log(R_n/R_0)$ undergoes a random walk towards positive values for user A and negative values for the impostor, who is forced to respond randomly to the see/don't see interrogations. The test can be terminated with the conclusion that user A is identified if $R_n/R_0 >= 1/p_{fp}$, or with the conclusion that the tested subject is an impostor if $R_n/R_0 <= p_{fn}$. It can also be proved that the mean number of interrogations N needed for the user and impostor is given by $$\mathbb{E}_A[N] \leq \frac{Log\left[\frac{2}{(1-q)p_{fp}}\right]}{\mathbb{H}\left(q\Big|\frac{1}{2}\right)}$$

$$\mathbb{E}_E[N] \leq \frac{2Log\left[\frac{2q_{min}p_{fn}}{1+q}\right]}{Log[4q(1-q)]}$$

where $\mathbb{H}(x,y)$ is the relative Shannon entropy, q the solution of the equation $P_{see}(\alpha_L \tilde{I}) = 1 - P_{see}(\alpha_H \tilde{I}) = q$, $\alpha_H$ and $\alpha_L$ the values of $\alpha$ for the high-$\alpha$ and low-$\alpha$ fields, respectively, and $q_{min} = P_{see}(\alpha_{min} \tilde{I})$, with $\alpha_{min}$ the minimum of $\alpha_L$. Requiring the false positive and false negative probabilities to be $p_{fp}=10^{-10}$ and $p_{fn}=10^{-4}$, respectively, we find that the test identifies user A and the impostor with N=63 and N=28 interrogations on average, respectively. These numbers where arrived at for q=0.1, which follows when $\alpha_H=3\alpha_L$ for $\alpha_{min}=0.02$. FIG. 3 depicts an example of the aforementioned random walks (FIG. 3a), as well as the distribution and mean values of the number of interrogations (FIG. 3b).

Figure 4:
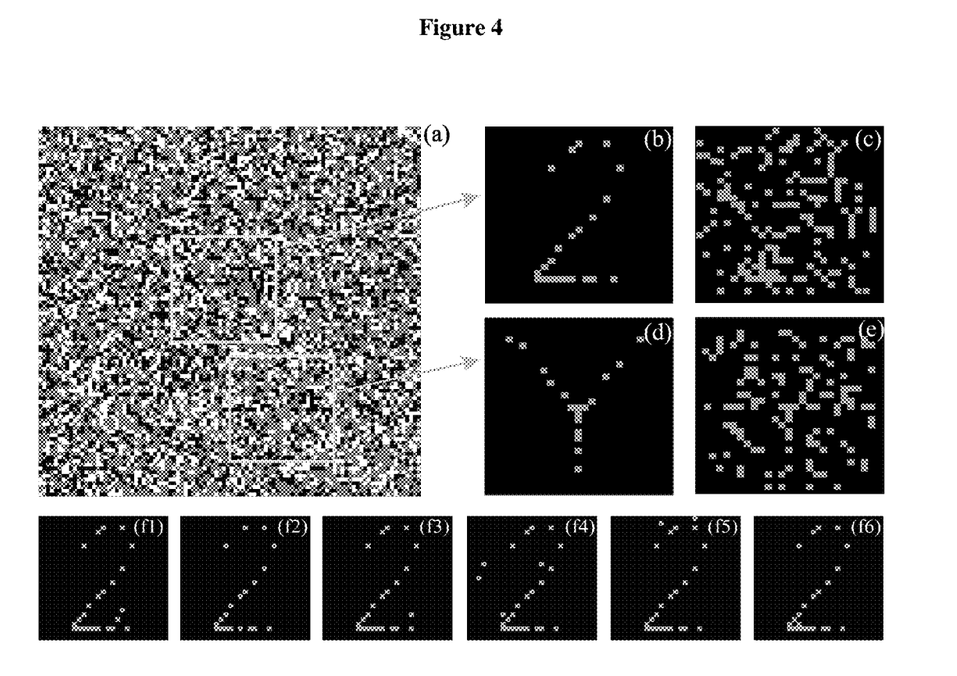
FIG. 4 depicts a stochastic simulation of the parallel identification method.

The parallel identification method is based on a pattern recognition scheme. The same values for $p_{fp}$ and $p_{fn}$ are obtained as in the serian method, but much faster. In the parallel method we illuminate simultaneously many receptive fields on the retina. The central idea is the following. Since the biometric device knows which retinal spots have low-$\alpha$ and which have high-$\alpha$, the device selects a number of high-$\alpha$ spots of the user who the tested subject claims to be, in such a way that they form a recognizable pattern, for example the number "2" or the letter "Y", as shown in FIG. 4a. Besides those high-$\alpha$ spots, the device simultaneously illuminates neighboring low-$\alpha$ spots. The user will probably recognize the illuminated pattern and will not perceive the "noise" of the low-$\alpha$ spots, as shown in FIGS. 4b and 4d. All spots are illuminated with pulses having the same mean photon number. Thus an impostor, even if he is equipped with an ideal photodetector (having unity quantum efficiency and zero dark noise), will detect light in all spots, as shown in FIGS. 4c and 4e, and will obviously not be able to recognize any pattern. Realistically, user A will perceive light in some low-$\alpha$ spots and will not detect some high-$\alpha$ spots, that is, he will not see part of the illuminated pattern. This can be simulated with a Poisson process, as shown in FIGS. 4/1-/6, and will determine the false negative probability.

Based on this methodology, we can calculate the probabilities $p_{fn}$ and $p_{fp}$. If the tested subject is required to recognize $\mu$ symbols in $\mu$ different interrogations in order to pass the test, and is provided with a set of M symbols as possible answers, then the only strategy of the impostor is to randomly pick an answer among the possible M answers. The probability that the impostor correctly answers $\mu$ questions is $p_{fp}=(1/M)^\mu$. For M=40 and just $\mu$=6 interrogations it follows that $p_{fp}=10^{-10}$. The false negative probability that the user A fails the test is calculated as follows.

If the probability that user A does not see a pixel among the pattern he is supposed to recognize is smaller than $p_H$, and the probability that he sees a noise pixel is smaller than $p_L$, then we assume that user A fails the test if he does not see at least $k > n_H p_H$ pixels of the pattern, or if he sees at least $l > n_L p_L$ noise pixels, where $n_H$ and $n_L$ is the number of pattern and noise pixels, respectively. Then the false negative probability satisfies the inequality $$p_{fn} \leq 1 - (1-P_k)^m$$

where $$P_k \leq e^{-n_H \mathbb{H}\left(\frac{k}{n_H}|p_H\right)} + e^{-n_L \mathbb{H}\left(\frac{l}{n_L}|p_L\right)}$$

For k=l=5 and $n_H \sim 25$, $n_L \sim 75$ as in the examples of FIG. 4, it follows that for 72 photons per pulse illuminating each pixel it is $p_{fn}=5*10^{-4}$.

Thus, both with the serial and the parallel method we obtain false positive and false negative probabilities at the level of $p_{fp}=10^{-10}$ and $p_{fn}=10^{-4}$, respectively. Summarizing, the New Central Ideas of the Current Invention are the Following Four.

(a) the physical quantity embodying the biometric information is the optical loss suffered by light in its path from the eye's surface towards the retina. (b) the values of this biometric quantifier are stored for the device's user using a weak laser source of known mean photon number per pulse, known photon statistics, and the user's responses on perceiving or not the light flashes. (c) subsequent identifications can be realized serially, where the biometric device randomly picks to illuminate ganglion receptive fields with either low-$\alpha$ or high-$\alpha$, but with the same mean photon number per pulse, and given the running record of responses, calculates the conditional probability that the tested subject is indeed the one he/she claims, while an impostor is forced to reply randomly to the interrogations and hence be quickly rejected (d) to minimize the test time, the identification can be realized in parallel, where the illuminated high-$\alpha$ fields form a recognizable pattern for the user, while the low-$\alpha$ spots simultaneously illuminated create noise for the impostor. The tested subject is offered a set of possible answers and required to respond on which particular pattern he recognized. It is noted that the pattern recognition scheme to be explained in the following has nothing to do with the classical pattern recognition of existing biometric methods, where image patterns that are part of an acquired image are compared with subsequent images, and a computer algorithm decides on the match of two images. In our case the pattern recognition has to do with the conscious perception by the brain of light patterns illuminating the retina. Finally, we note that optical perimeters test for eye disease using a similar method for visual perception at the threshold of vision, the statistical inference they face is of a fundamentally different nature, i.e. it is about estimating the visual sensitivity and comparing to the average healthy values, whereas in our case of identification we aim at the correct/incorrect perception of light interrogating only high/low values of the visual sensitivity, which provides a much faster result than in the case of detecting disease.

FIGURE CAPTIONS

FIG. 4a shows a simulated $\alpha$-map for the user A consisting of 10000 pixels, where white pixels code receptive fields with high $\alpha$ ($0.16 <= \alpha <= 0.20$), grey pixels fields with intermediate $\alpha$ ($0.04 <= \alpha <= 0.16$) and black pixels field with low $\alpha$ ($0.02 <= \alpha <= 0.04$). In the same Figure it is shown how one can form a pattern from high-$\alpha$ pixels, for example the number "2" or the letter "Y". In FIG. 4c we show the illuminated pixels, those which form the pattern "2", and many others with low-$\alpha$ (similarly for letter "Y" in FIG. 4e). It is probable that user A will not perceive those low-$\alpha$ pixels, while the impostor will see them all, given he is technologically sophisticated and equipped with an ideal photodetector, and thus will not be able to recognize any pattern. In FIGS. 4b and 4d we show the ideal case where the user does not perceive any of the low-$\alpha$ spots. In reality, the user will not see some of the high-$\alpha$ pattern-forming pixels, and will perceive some of the low-$\alpha$ noise pixels. This realistic situation is simulated with 6 realizations of a Poisson process in FIGS. 4/1-/6.

REFERENCES

[1] J. A. Unar, W. C. Seng and A. Abbasi, *A review of biometric technology along with trends and prospects*, Patt. Recogn. 47, 2674 (2014).
[2] N. Gisin, G. Ribordy, W. Tittel and H. Zbinden, *Quantum cryptography*, Rev. Mod. Phys. 74, 145 (2002).
[3] J. E. Dowling, *The Retina* (Harvard University, Cambridge, Mass., 1987).
[4] S. Hecht, S. Shlaer and M. H. Pirenne, *Energy, quanta and vision*, J. Gen. Physiol. 25, 819 (1942).
[5] A. Rose, *The sensitivity performance of the human eye on an absolute scale*, J. Opt. Soc. Am. 38, 196 (1948).
[6] F. Rieke and D. A. Baylor, *Molecular origin of continuous dark noise in rod photoreceptors*, Biophys. J. 71, 2553 (1996).
[7] F. Rieke and D. A. Baylor, *Origin of reproducibility in the responses of retinal rods to single photons*, Biophys. J. 75, 1836 (1998).
[8] F. Rieke and D. A. Baylor, *Single-photon detection by rod cells of the retina*, Rev. Mod. Phys. 70, 1027 (1998).
[9] F. Rieke and D. A. Baylor, *Origin and functional impact of dark noise in retinal cones*, Neuron 26, 181 (2000).
[10] N. Sim, D. Bessarab, C. M. Jones and L. A. Krivitsky, *Method of targeted delivery of laser beam to isolated retinal rods by fiber optics*, Biomed. Opt. Expr. 2, 2926 (2011).
[11] N. Sim, M. F. Cheng, D. Bessarab, C. M. Jones and L. A. Krivitsky, *Measurement of photon statistics with live photoreceptor cells*, Phys. Rev. Lett. 109, 113601 (2012).
[12] N. M. Phan, M. F. Cheng, D. A. Bessarab and L. A. Krivitsky, *Interaction of fixed number of photons with retinal rod cells*, Phys. Rev. Lett. 112, 213601 (2014).
[13] F. Lucas and K. Hornberger, *Incoherent control of the retinal isomerization in rhodopsin*, Phys. Rev. Lett. 113, 058301 (2014).
[14] W. Bialek, Biophysics (Princeton University Press, Princeton and Oxford, 2012).
[15] H. J. A. Dartnall and C. F. Goodeve, *Scotopic luminosity curve and the absorption spectrum of visual purple*, Nature 39, 409 (1937).
[16] H. B. Barlow, *Vertebrate Photoreception* (Ed. H. B. Barlow and P. Fatt, Academic, New York, 1977).
[17] G. D. Field, A. P. Sampath and F. Rieke, *Retinal processing near absolute threshold: from behavior to mechanism*, Annu. Rev. Physiol. 67, 491 (2005).
[18] B. Teklu, S. Olivares and M. G. A. Paris, *Bayesian estimation of one-parameter qubit gates*, J. Phys. B: At. Mol. Opt. Phys. 42, 035502 (2009).
[19] B. M. Escher, R. L. de Matos Filho and L. Davidovich, *General framework for estimating the ultimate precision limit in noisy quantum-enhanced metrology*, Nat. Phys. 7, 406 (2011).
[20] B. M. Escher, R. L. de Matos Filho and L. Davidovich, *Quantum metrology for noisy systems*, Braz. J. Phys. 41, 229 (2011).

The invention claimed is:
1. Method for the biometric identification of a human tested subject, the method comprising:
    illuminating several ganglion receptive fields on retina of the tested subject with pulses of coherent laser, such that each ganglion receptive field is illuminated by at least one pulse;
    measuring with a single-photon counter mean photon number per pulse;
    calculating for each ganglion receptive fields parameter $\alpha$ including optical losses of the at least one pulse on its optical path from surface of the towards the retina, which losses include probability of no photodetection by the ganglion receptive fields;

constructing a α-map based on the calculated parameter α of each of the ganglion receptive fields of the tested subject, and on responses of the tested subject which responses include indication regarding perceiving the pulses.

2. Method according to claim 1, wherein said step of constructing a α-map is carried out with a coherent laser light source, electronically controlled mechanical iris creating the laser flash of duration 0.01 s to 0.1 s, optical filters decreasing the laser flash intensity to about 100 photons per pulse, single-photon counter for the precise measurement of the mean photon number per flash, optical arrangement for guiding the laser beam towards the desired illumination field on the retina, and the conscious activity of the user, who is asked to respond positively/negatively on whether he perceives the light flashes illuminating his receptive fields.

3. Method according to claim 1, further comprising identification procedure which is performed by a serial illumination of different ganglion receptive fields that are described either by a low or by a high value of the α parameter of the real user, the choice of what type of field is illuminated in every flash being done randomly, but using the same mean photon number per pulse for both low-α and high-α fields, so that any impostor pretending to be the real user is forced to reply randomly to the interrogations on perceiving or not the light flashes, not knowing what kind of field (low-α or high-α) is illuminated in any given flash, and not being able to retrieve any information by measuring the photon number per flash.

4. Method according to claim 3, wherein the identification following the serial illumination of different ganglion receptive fields is performed by calculating the conditional probability that the examined subject is the one claiming to be, given the running record of the subject's responses, with the identification to be completed if a mathematically defined quantity based on the running record of the subject's responses exceeds values defined by the desired values of false positive and false negative identification probability, and which method minimizes the test time of the serial illumination, achieving false positive and false negative identification probability of one in 10 billion and one in 10 thousand, respectively, with only 50 interrogations on average.

5. Method according to claim 1, further comprising identification procedure which is performed in parallel, with the simultaneous illumination of several ganglion receptive fields which are described either by low-α or by high-α for the real user's α-map, using the same mean photon number per flash for both types of fields, with the fields being chosen so that the high-α fields form a recognizable pattern for the real user, while the low-α fields create noise for an impostor, so that he is unable to recognize any pattern, which noise goes on average undetected by the real user, while the tested subject is asked to point which one among several given patterns he recognized, with the identification being complete if the tested subject correctly responds to a specific number of interrogations defined by the desired values for the false positive and false negative identification probabilities.

* * * * *